(12) United States Patent
Sumner (10) Patent No.: US 6,432,305 B1
(45) Date of Patent: Aug. 13, 2002

(54) WATER FILTERING KIT

(76) Inventor: Randall G. Sumner, 5020 Greenbriar Trail, Mt. Dora, FL (US) 32757

( * ) Notice: Subject to any disclaimer, the term of this patent is extended or adjusted under 35 U.S.C. 154(b) by 0 days.

(21) Appl. No.: 09/733,855

(22) Filed: Dec. 8, 2000

(51) Int. Cl.[7] .......................... B01D 35/30; B01D 35/34
(52) U.S. Cl. .................. 210/232; 210/241; 210/244; 210/238
(58) Field of Search ................. 210/232, 241, 210/238, 282, 244

(56) References Cited

U.S. PATENT DOCUMENTS

| | | | |
|---|---|---|---|
| 3,498,457 A | * | 3/1970 | Gough |
| 3,585,130 A | * | 6/1971 | Gregory |
| 3,684,100 A | | 8/1972 | Close |
| 3,842,870 A | | 10/1974 | Burgess |
| 3,907,688 A | | 9/1975 | Close |
| 3,926,815 A | | 12/1975 | McClory |
| 4,013,562 A | * | 3/1977 | Gott |
| 4,049,550 A | * | 9/1977 | Obidniak |
| 4,271,015 A | * | 6/1981 | Moore |
| 4,670,144 A | * | 6/1987 | McClausland et al. |
| 4,849,100 A | * | 7/1989 | Papandrea |
| 4,859,320 A | * | 8/1989 | Beall, Jr. |
| 5,004,535 A | * | 4/1991 | Bosko et al. |
| 5,304,300 A | | 4/1994 | Parsons |
| 5,399,260 A | * | 3/1995 | Eldredge et al. |
| 5,611,923 A | | 3/1997 | Suri et al. |
| 5,632,892 A | * | 5/1997 | Klein |
| 5,709,795 A | * | 1/1998 | Park et al. |
| 5,788,858 A | * | 8/1998 | Acernese et al. |
| 5,972,216 A | * | 10/1999 | Acernese et al. |

* cited by examiner

Primary Examiner—Thomas M. Lithgow
(74) Attorney, Agent, or Firm—Edward M. Livingston, Esq.

(57) ABSTRACT

A water-filtering kit has a filter container (1, 28, 32, 37, 41). A water filter (8) is positioned on an interior portion of the filter container. A filter-inlet connection (9) on the water filter is positioned in tube-access proximity to an inlet-tube aperture (10) in the filter container. Similarly, a filter-outlet connection (11) on the water filter is positioned in tube-access proximity to an outlet-tube aperture (12) in the filter container. The filter container is sized and shaped to contain an inlet tube (13) and an outlet tube (14) which can include one or more hoses in a compacted mode that includes winding, spooling and rolling. The filter container has a container top (7, 31, 36, 40) proximate which or to which a filter head (25) of the filter is attached. The filter, the inlet tube and the outlet tube are positioned in the filter container for storage and transportation. The inlet tube and the outlet tube can have quick disconnects (21, 22, 23, 24).

20 Claims, 8 Drawing Sheets

WATER FILTERING KIT

BACKGROUND OF THE INVENTION

This invention relates to water filtering for motor homes, boats, sleeper trucks, campers, house trailers, tents and other movable or temporary abodes.

Filters for filtering water for human use are well known. However, there is no known water-filtering kit for convenience of water-system attachment and detachment, transportation, storage and sanitary protection for motor homes, boats, sleeper trucks, campers, house trailers, tents and other movable or temporary abodes in a manner taught by this invention.

Without a water-filtering kit that positions basic filtering and tubular components in working relationship to the kit for such movable or temporary abodes, water-filtering components are difficult to handle, inconvenient to use, time-consuming to attach and detach to water systems and are subject to contamination by sewage and other plumbing items that are usually in close proximity during storage.

Filtering human-use water for movable and temporary abodes is highly important because quality of water is not usually known or reliable at likely different temporary places where the movable or temporary abodes may be from-time-to-time. Danger is compounded by contamination from storage and transportation of separate and unprotected filtering components in confined vehicle compartments that usually also contain sewage-handling components.

Examples of most-closely related known but yet different devices include a filtering-attachment aid described in U.S. Pat. No. 3,926,815, issued to McClory on Dec. 16, 1975. U.S. Pat. No. 5,304,300, issued to Parsons on Apr. 19, 1994, described an exterior filtering canister for recreational vehicles, but it was not a kit with handling and sanitation advantages. All other known prior art relates to separate components of a filtering system.

SUMMARY OF THE INVENTION

Objects of patentable novelty and utility taught by this invention are to provide a water-filtering kit which:

is quick and easy to position in fluid communication intermediate a water source and water-use plumbing of a movable or temporary abode;

protects filters, hoses and connections from possible contamination by other objects, sewage-handling items, transient water, dust and life forms in storage and transportation conditions;

positions filtering components for ease of access;

provides convenient and easy handling of the filtering components in a kit form; and can be fitted with a selection of filters and water hoses.

This invention accomplishes these and other objectives with a water-filtering kit having a filter container. A water filter is positioned on an interior portion of the filter container. A filter-inlet connection on the water filter is positioned in tube-access proximity to an inlet-tube aperture in the filter container. Similarly, a filter-outlet connection on the water filter is positioned in tube-access proximity to an outlet-tube aperture in the filter container. The filter container is sized and shaped to contain an inlet tube and an outlet tube which can include one or more hoses in a compacted mode that includes winding, spooling and rolling. The filter container has a container top proximate which or to which a filter head of the filter is attached. The filter, the inlet tube and the outlet tube are positioned in the filter container for storage and transportation. The inlet tube and the outlet tube can have quick disconnects for easy and quick insertion of the kit into the water supply.

The above and other objects, features and advantages of the present invention should become even more readily apparent to those skilled in the art upon a reading of the following detailed description in conjunction with the drawings wherein there is shown and described illustrative embodiments of the invention.

BRIEF DESCRIPTION OF DRAWINGS

This invention is described by appended claims in relation to description of a preferred embodiment with reference to the following drawings which are explained briefly as follows:

DESCRIPTION OF PREFERRED EMBODIMENT

Listed numerically below with reference to the drawings are terms used to describe features of this invention. These terms and numbers assigned to them designate the same features throughout this description.

| | |
|---|---|
| 1. | Horizontal case |
| 2. | First side |
| 3. | Second side |
| 4. | First end |
| 5. | Second end |
| 6. | Bottom |
| 7. | Lid |
| 8. | Water filter |
| 9. | Filter-inlet connection |
| 10. | Inlet-tube aperture |
| 11. | Filter-outlet connection |
| 12. | Outlet-tube aperture |
| 13. | Inlet tube |
| 14. | Outlet tube |
| 15. | Water tap |
| 16. | Use plumbing |
| 17. | Water-source connection |
| 18. | Inlet-tube connection |
| 19. | Outlet-tube connection |
| 20. | Water-use connection |
| 21. | First quick-disconnect member |
| 22. | Second quick-disconnect member |
| 23. | Third quick-disconnect member |
| 24. | Fourth quick-disconnect member |
| 25. | Filter head |
| 26. | Filter sump |
| 27. | Filter element |
| 28. | Vertical case |
| 29. | Sides |
| 30. | Container bottom |
| 31. | Container top |
| 32. | Filleted case |
| 33. | Flat sides |
| 34. | Arcuate sides |
| 35. | Filleted container bottom |
| 36. | Filleted container top |
| 37. | Cylindrical case |
| 38. | Cylindrical wall |
| 39. | Circular container bottom |
| 40. | Circular container top |
| 41. | Truncate-conical case |
| 42. | Fixed bottom wall |
| 43. | Arcuate handle |
| 44. | Conical walls |

Figure 1:
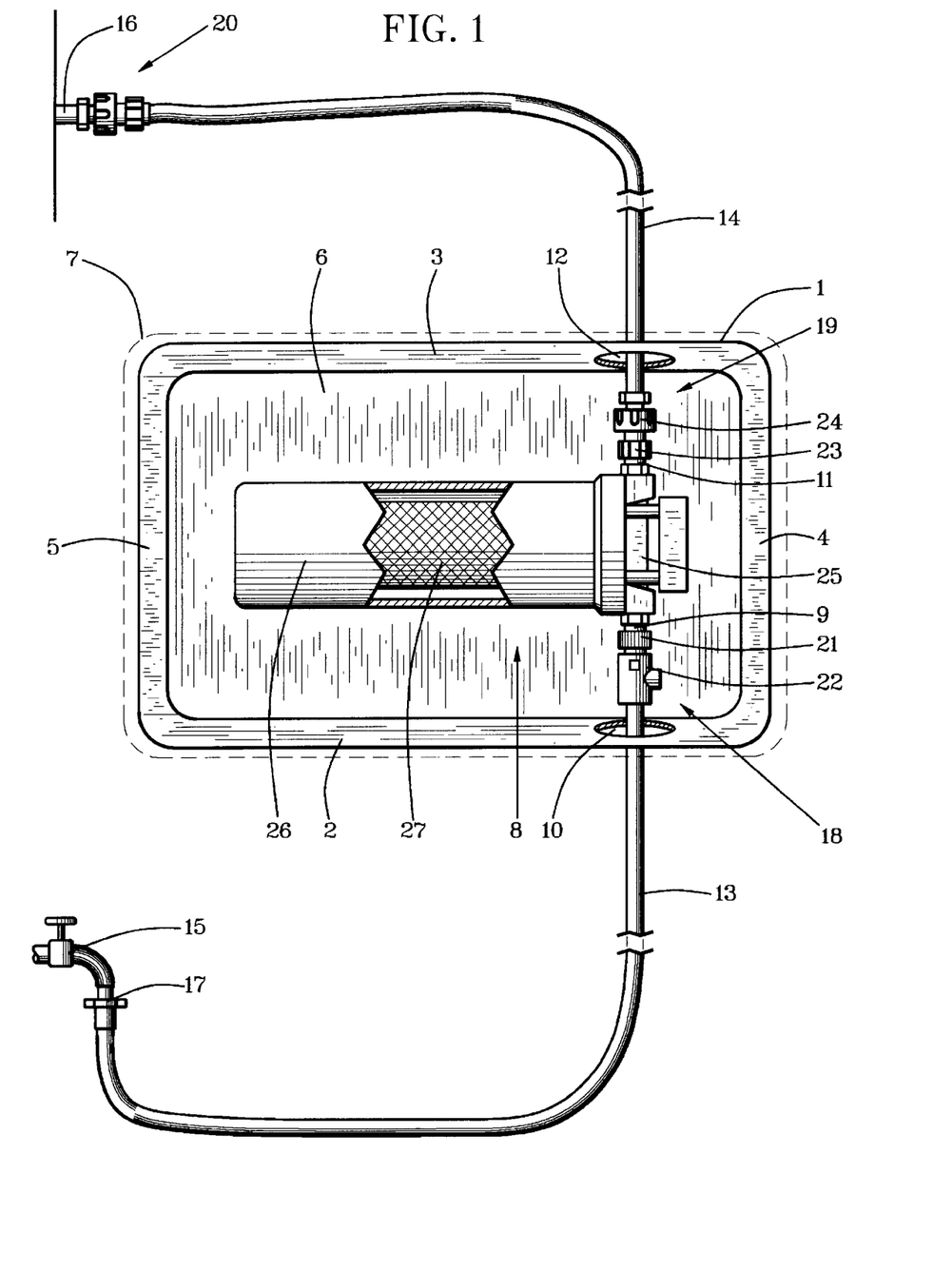
FIG. 1 is a partially cutaway top view of an embodiment having a filter container that is a horizontal case.
Figure 2:
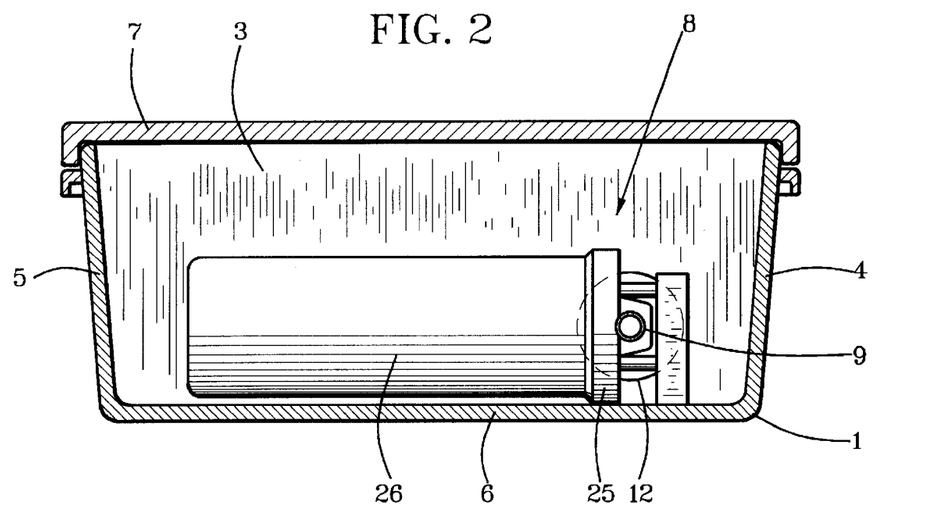
FIG. 2 is a partially cutaway side view of the FIG. 1 illustration.
Figure 3:
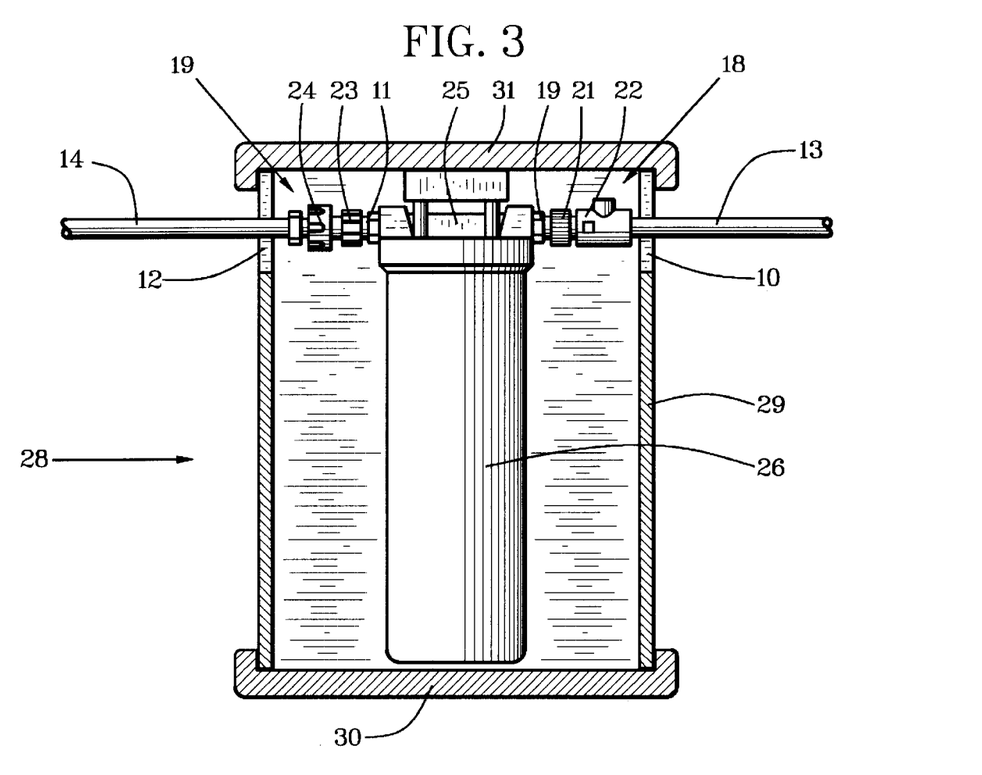
FIG. 3 is a partially cutaway side view of an embodiment having a filter container that is a vertical case.
Figure 4:
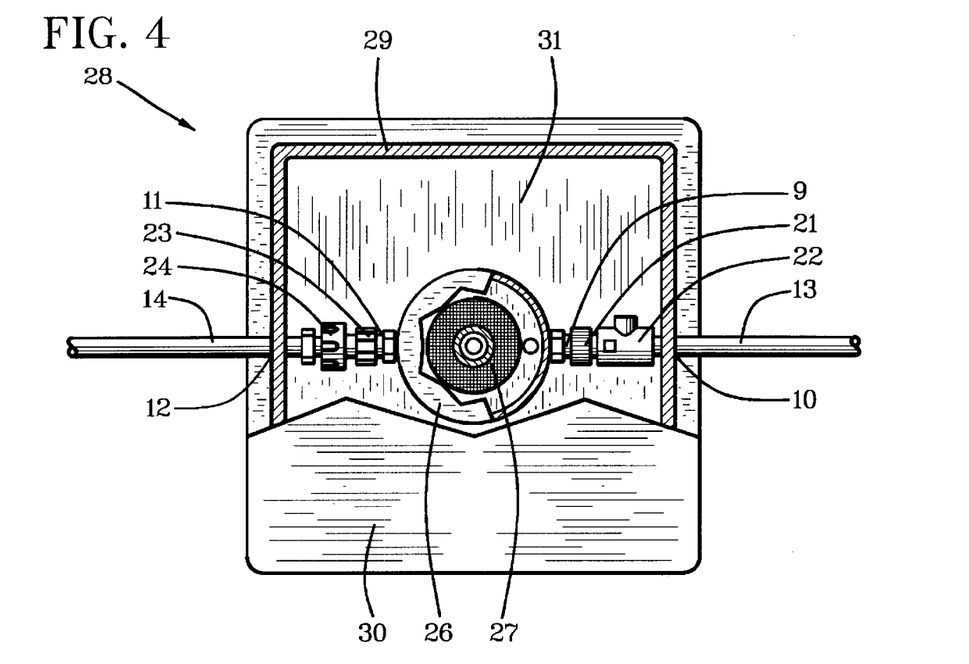
FIG. 4 is a partially cutaway bottom view of the FIG. 3 illustration.
Figure 14:
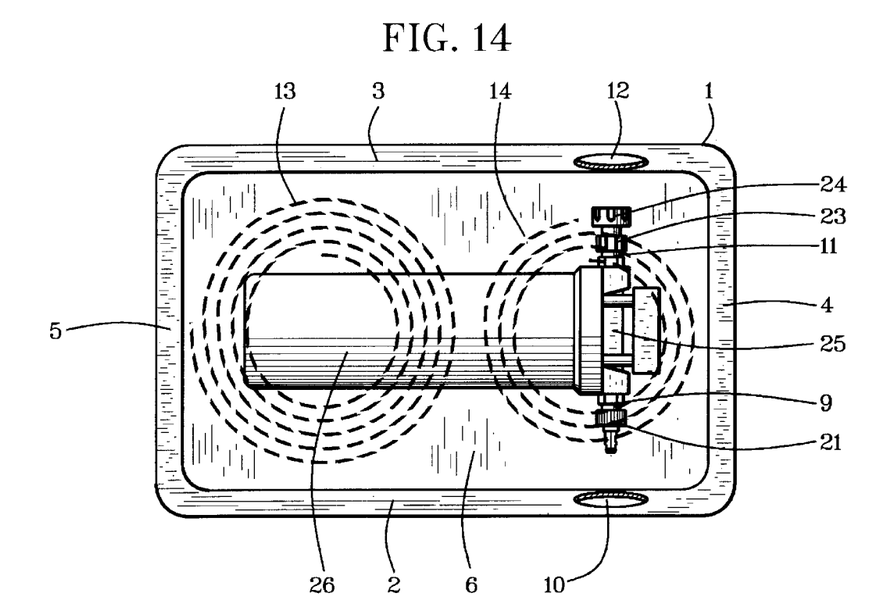
FIG. 14 is a partially cutaway top view of the FIG. 1 horizontal case containing coiled inlet and outlet tubes represented by wide dashed lines.

Reference is made first to FIGS. 1–2 and 14. The water-filter kit has a filter container that can include an embodiment having a horizontal case 1 with a first side 2, a second side 3, a first end 4, a second end 5, a bottom 6 and a lid 7. A water filter 8 is positioned on an internal portion proximate the first end 4. A filter-inlet connection 9 on the water filter 8 is positioned in tube-access proximity to an inlettube aperture 10 in the filter container that includes the horizontal case 1. Oppositely disposed on the filter container, a filter-outlet connection 11 on the water filter 8 is positioned in tube-access proximity to an outlet-tube aperture 12.

The filter container, including the embodiment having the horizontal case 1, is sized and shaped to contain an inlet tube 13 in a compacted mode and an outlet tube 14 in a compacted mode in addition to containing the water filter 8 for transportation and storage. The compacted modes for the inlet tube 13 and the outlet tube 14 can be coiled or rolled as represented by dashed wide lines in FIG. 14. As depicted by relative sizes of coils, the inlet tube 13 is usually longer to reach a water to source that is usually a water tap 15 and the outlet tube 14 is shorter to reach usually nearby water-use plumbing 16.

The inlet tube 13 has a water-source connection 17 on a water-source end and an inlet-tube connection 18 on a filter-inlet end. The outlet tube 14 has an outlet tube connection 19 on a filter end and a water-use connection 20 on a water-use end.

Preferably, the filter-inlet connection 9 includes a first quick-disconnect member 21 and the inlet-tube connection 18 includes a second quick-disconnect member 22 that mates with the first quick-disconnect member 21. Also preferably, the filter-outlet connection 11 includes a third quick-disconnect member 23 and the outlet-tube connection 19 includes a fourth quick-disconnect member 24 which mates with the third quick-disconnect member 23.

The water filter preferably has a filter head 25, a filter sump 26 attachable removably to the filter head 25 and a filter element 27 positioned removably in the filter sump 26. The filter-inlet connection 9 and the filter-outlet connection 11 are positioned on the filter head 25 for tube-access proximity to the inlet-tube aperture 10 and to outlet-tube aperture 12 respectively.

For the filter container that includes the horizontal case 1, the filter head 25 is positioned proximate the first end 4. The filter container has a length intermediate the first end 4 and the second end 5 that is sufficient to contain a combined length of the filter head 25 and the filter sump 26 and, in addition, to allow the filter sump 26 to be removed downwardly from the filter head 25 for removal of the filter sump 26 and for replacement of the filter sump 26 for changing the filter element 27 that is contained in the filter sump 26.

The horizontal case 1 is particularly for water filters 8 that can be used advantageously in a horizontal position.

Figure 5:
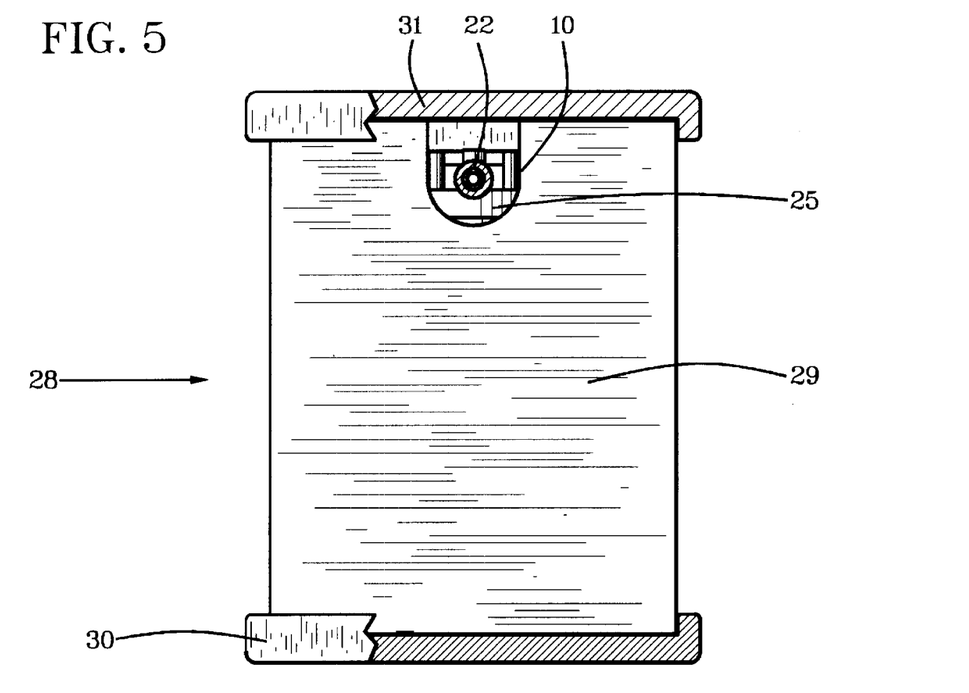
FIG. 5 is a partially cutaway inlet-side view of the FIG. 3 illustration.
Figure 6:
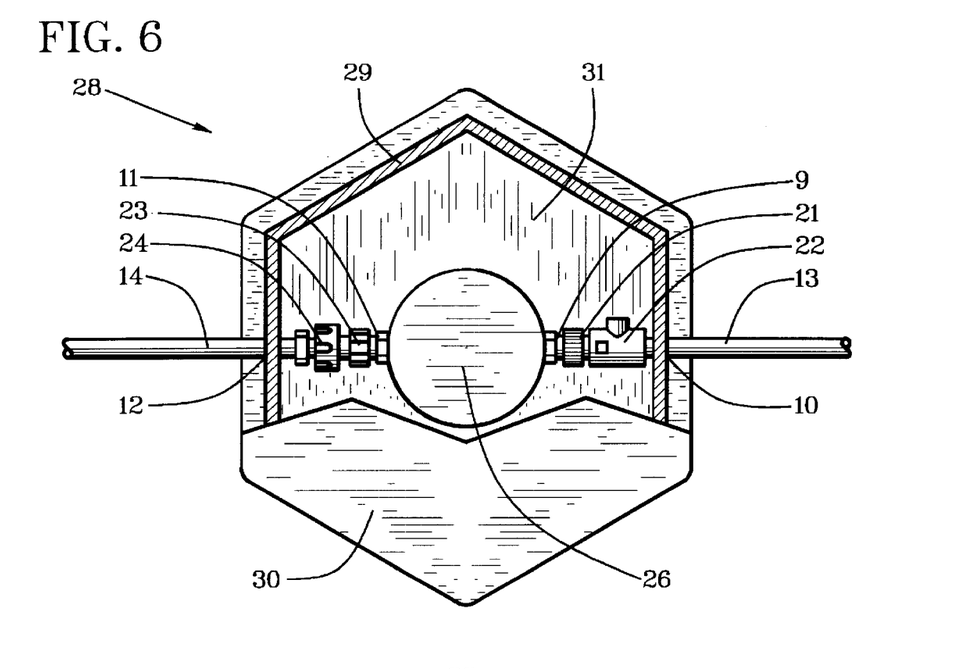
FIG. 6 is a partially cutaway bottom view of an embodiment having a vertical case with a plurality of sides divisible by two.
Figure 7:
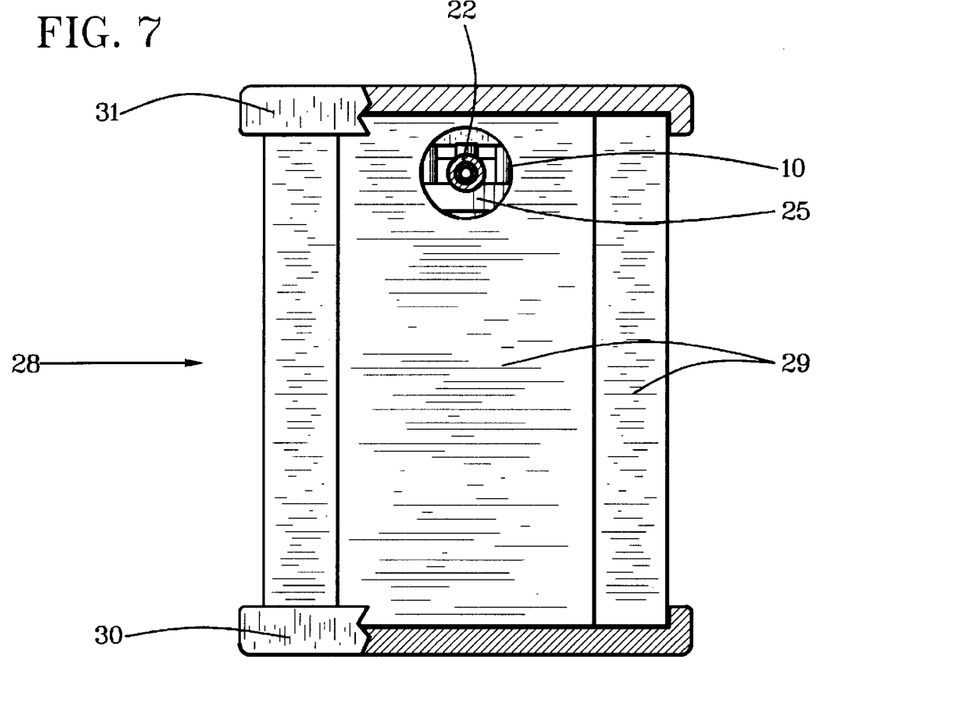
FIG. 7 is a partially cutaway side elevation view of the FIG. 6 illustration.

Referring to FIGS. 3–9 and 15, the water-filter kit can include a filter container that is a vertical case 28 having a plurality of sides 29, a container bottom 30 and a container top 31. The plurality of sides 29 is at least four and divisible by two. The container bottom 30 is perpendicular to an axis of the filter container and is attached predeterminedly to the plurality of the sides 29. The filter head 25 is attached to a central portion of an interior side of the container top 31. The inlet-tube aperture 10, which can be U-shaped as depicted in FIG. 5 or circular as depicted in FIG. 7, is in an inlet side of the vertical case 28 filter container and the outlet-tube aperture 12, which also can be U-shaped, is in an outlet side of the vertical case 28 filter container. Predetermined attachment of the container bottom 30 to the sides 29 can be with an overlap as shown or other attachment structure and can be either fixed or removable.

The vertical case 28 and its variants having one or more flat sides 29 also can be used in a horizontal attitude.

Figure 15:
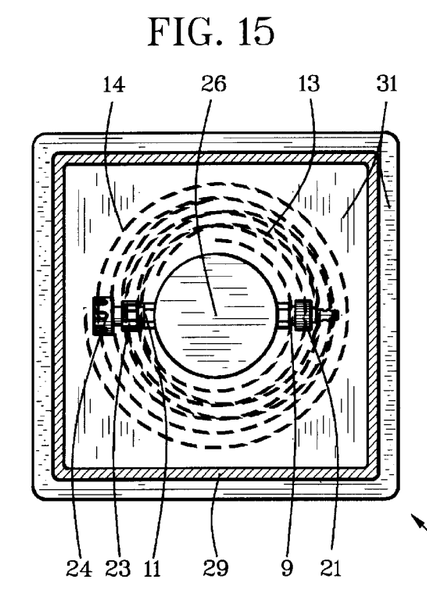
FIG. 15 is a partially cutaway bottom view of a vertical case representative of vertical cases having flat sides and containing coiled inlet and outlet tubes represented by wide dashed lines.

The filter container having the vertical case 30 has a container length to receive the combined length of the filter head 25 and the filter sump 26. It also has an internal periphery to receive the filter sump 26 with the inlet tube 13 and the outlet tube 14 wound onto an outside periphery of the filter sump 26 as shown in FIG. 15 with the inlet tube 13 and the outlet tube 14 represented by wide dashed lines. This and other vertical embodiments can be shorter and more compact with the container bottom 30 and/or the container top 31 being removable for access to the filter sump 26 and the filter element 27 and with the inlet tube 13 and the outlet tube 14 wound onto the filter sump 26.

Figure 8:
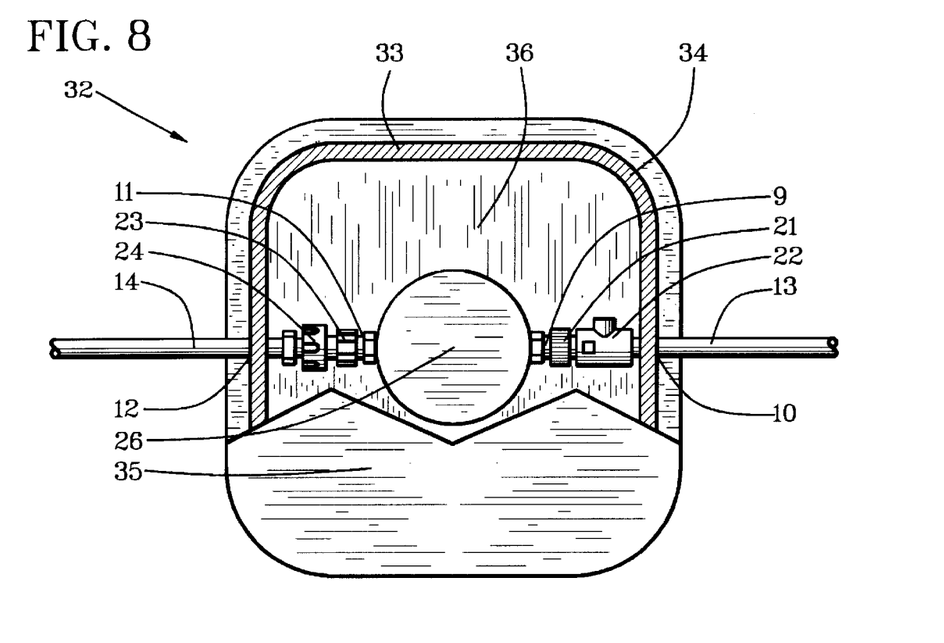
FIG. 8 is a partially cutaway bottom view of an embodiment having a filleted case with flat sides and arcuate sides.
Figure 9:
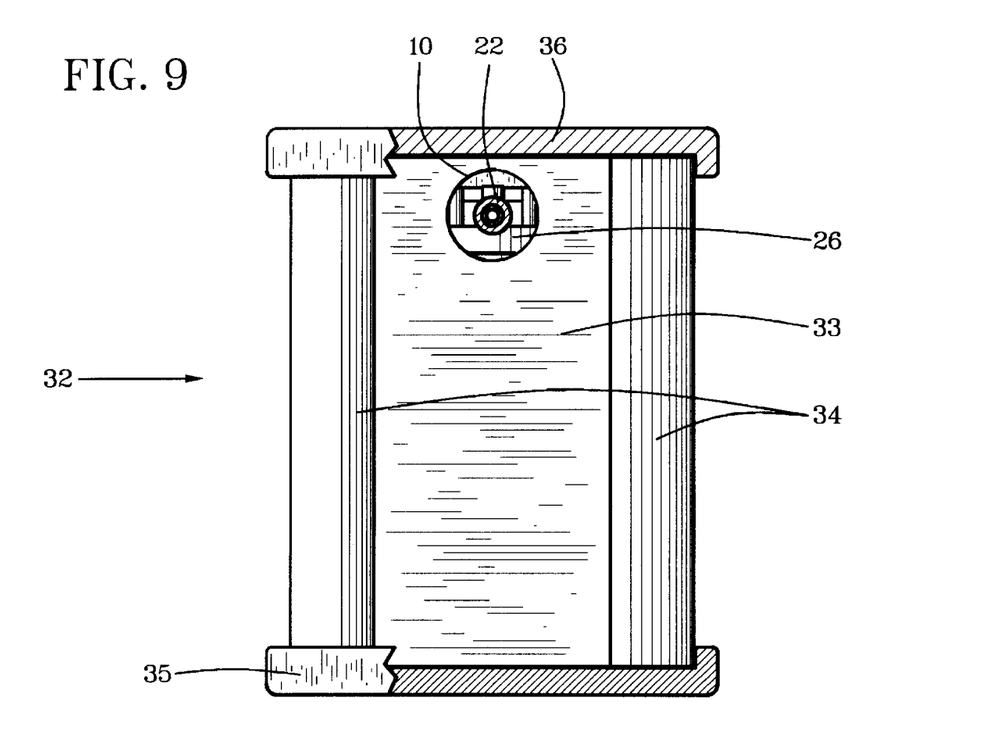
FIG. 9 is a partially cutaway side elevation view of the FIG. 8 illustration.

As shown in FIGS. 8–9, the filter container can include a filleted case 32 that differs from the vertical case 28 by having flat sides 33 and arcuate sides 34 predeterminedly, a filleted container bottom 35 and a filleted container top 36. Other features are the same as described for FIGS. 3–7.

Figure 10:
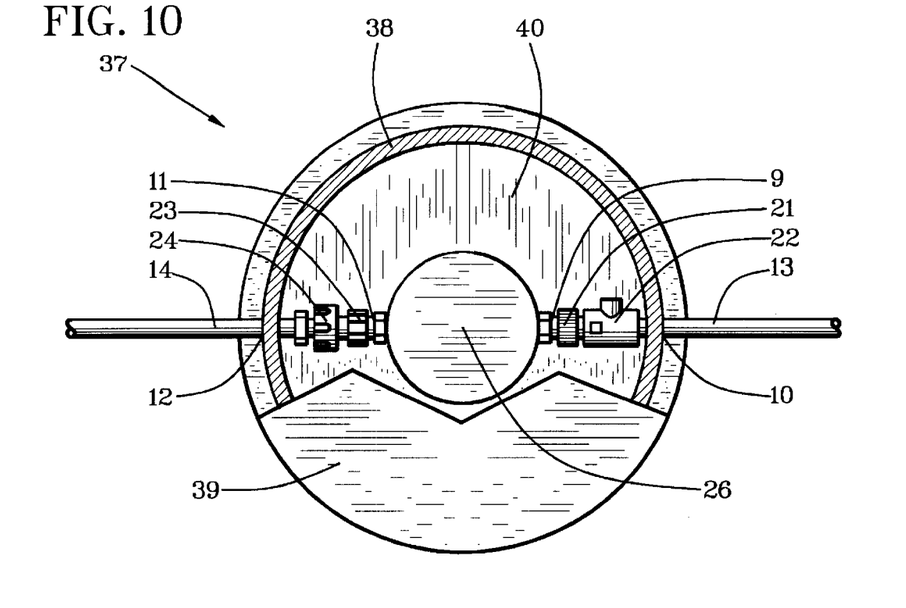
FIG. 10 is a partially cutaway bottom view of an embodiment having a cylindrical case.
Figure 11:
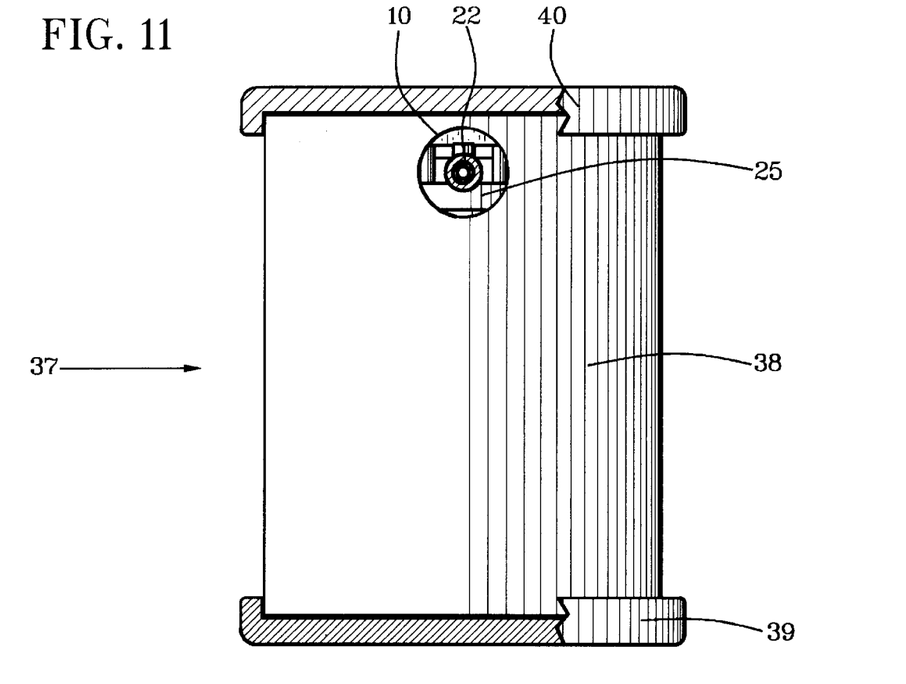
FIG. 11 is a partially cutaway side elevation view of the FIG. 10 illustration.
Figure 12:
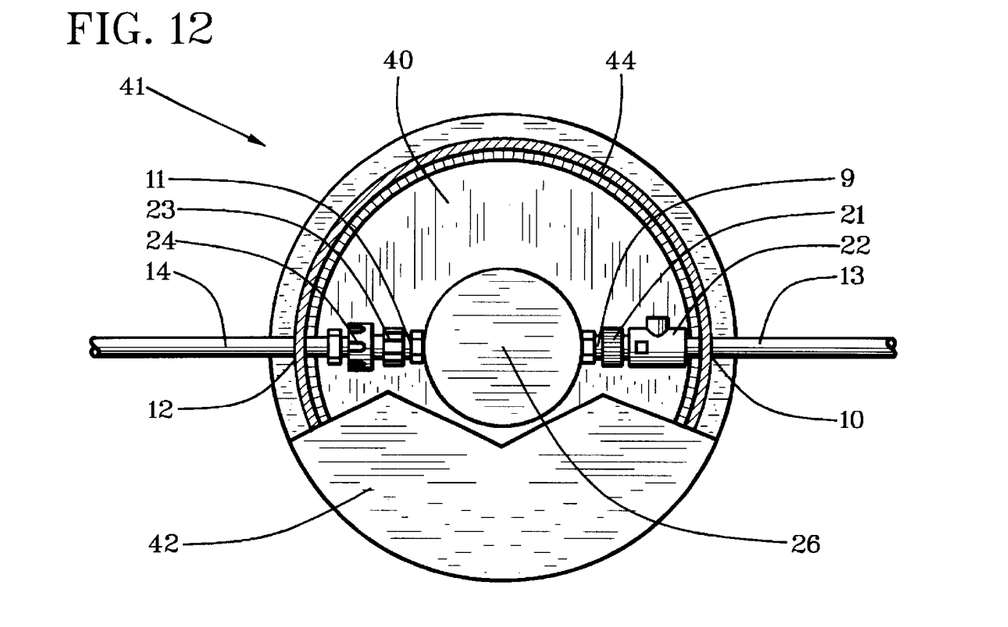
FIG. 12 is a partially cutaway bottom view of an embodiment having a truncate-conical case.
Figure 13:
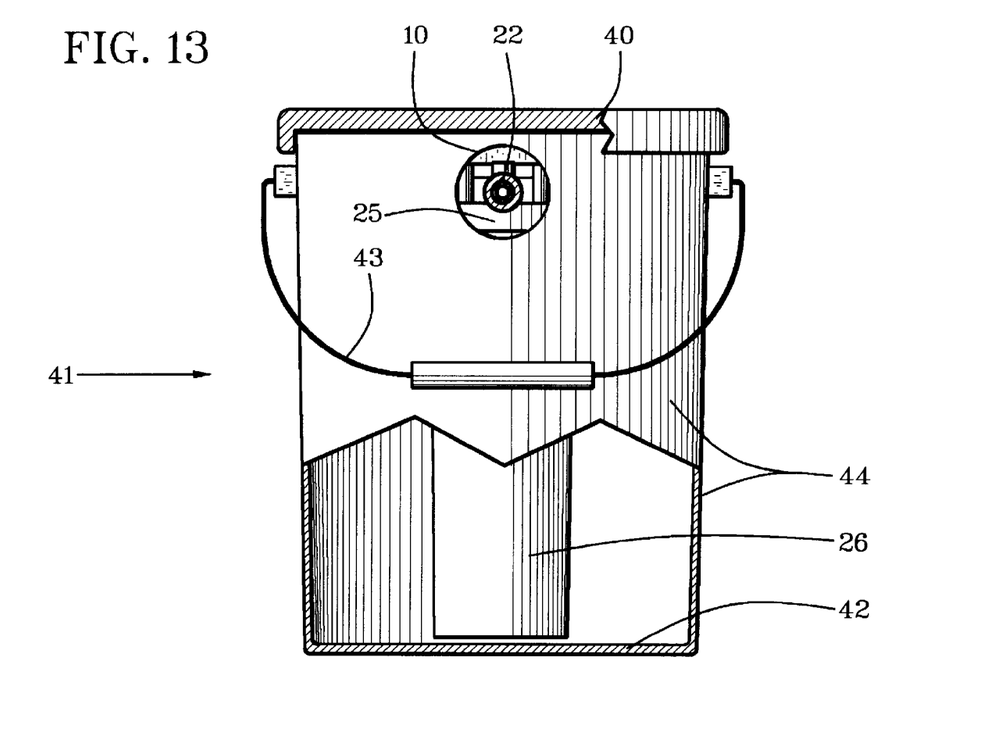
FIG. 13 is a partially cutaway side elevation view of the FIG. 12 illustration.
Figure 16:
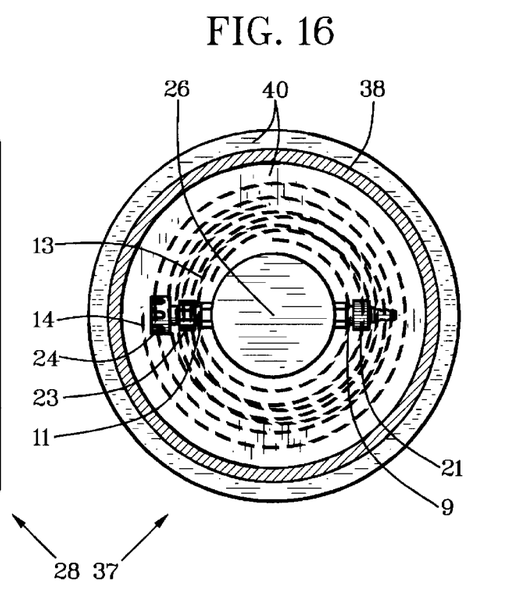
FIG. 16 is a partially cutaway bottom view of a cylindrical case representative of circular cases containing coiled inlet and outlet tubes represented by wide dashed lines.

Referring to FIGS. 10–11 and 16, the filter container can include a cylindrical case 37 having a cylindrical wall 38, a circular container bottom 39 and a circular container top 40. The circular container bottom 39 and the circular container top 40 are perpendicular to an axis of the cylindrical case 37, but are not necessarily perpendicular to the cylindrical wall 38. The other features of cylindrical case 37 are the same as described in relation to FIGS. 4–9.

Referring to FIGS. 10–13 and 16, the filter container can include a truncate-conical case 41 with a preferably fixed bottom wall 42 and the circular container top 40 to which the filter head 25 is attached. An arcuate handle 43 makes this embodiment particularly handy. Slight conical structure of the truncate-conical case 41 and the filter sump 26 make it easy to get a wound inlet tube 13 and a wound outlet tube 14 in and out of conical walls 44 for the wound mode depicted in FIG. 16.

The fixed bottom wall 42 and conicity of the conical walls 44 can be employed also for variants of the vertical case 28 and the cylindrical case 37 described in relation to FIGS. 3–11.

The cylindrical case 37 and the truncate-conical case 41 are best suited to vertical use with water filters 8 that require vertical use but can be used in a horizontal attitude if rolling is not a problem.

A new and useful water-filtering kit having been described, all such foreseeable modifications, adaptations, substitutions of equivalents, mathematical possibilities of combinations of parts, pluralities of parts, applications and forms thereof as described by the following claims and not precluded by prior art are included in this invention.

What is claimed is:

1. A water-filter kit comprising:

a filter container having a removable lid, side walls and a bottom attached to the side walls;

a water filter positioned on an internal portion of the filter container;

a filter-inlet connection on the water filter positioned in tube-access proximity to an inlet-tube aperture in the filter container;

a filter-outlet connection on the water filter positioned in tube-access proximity to an outlet-tube aperture in the filter container; and the filter container being sized and shaped to contain an inlet tube in a compacted mode, to contain an outlet tube in a compacted mode and to contain the water filter for transportation and storage.

2. The water-filter kit of claim 1 wherein:

the inlet tube has a water-source connection on a water-source end and an inlet-tube connection on a filter-inlet end; and the outlet tube has an outlet-tube connection on a filter end and a water use connection on a water-use end.

3. The water-filter kit of claim 2 wherein:

the filter-inlet connection includes a first quick-disconnect member; and the inlet-tube connection includes a second quick-disconnect member which mates with the first quick-disconnect member.

4. The water-filter kit of claim 2 wherein:

the filter-outlet connection includes a third quick-disconnect member; and the outlet-tube connection includes a fourth quick-disconnect member which mates with the third quick-disconnect member.

5. A water-filter kit comprising:

a filter container being a horizontal case with a first side, a second side, a first end, a second end, a bottom and a removable lid;

a water filter positioned on an internal portion of the filter container;

the water filter having a filter head, a filter sump attachable removably to the filter head and a filter element positioned removably in the filter sump;

a filter-inlet connection on the filter head positioned in tube-access proximity to an inlet-tube aperture in the filter container;

a filter-outlet connection on the filter head positioned in tube-access proximity to an outlet-tube aperture in the filter container; and the filter container being sized and shaped to contain an inlet tube in a compacted mode, to contain an outlet tube in a compacted mode and to contain the water filter for transportation and storage.

6. The water-filter kit of claim 5 wherein:

the filter container includes a horizontal case with a first side, a second side, a first end, a second end, a bottom and a removable lid;

the filter head is positioned proximate the first end of the filter container;

the filter container has a length intermediate the first end and the second end;

the length being sufficient to contain a combined length of the filter head and the filter sump and to allow the filter sump to be removed downwardly from the filter head for removal of the filter sump and for replacement of the filter sump for changing the filter element that is contained in the filter sump;

the inlet-tube aperture is in the first side of the filter container; and the outlet-tube aperture is in the second side of the filter container.

7. The water-filter kit of claim 5 wherein:

the filter container includes a vertical case with a plurality of sides, a container bottom and a container top;

the plurality of sides being at least four and divisible by two, the container bottom is perpendicular to an axis of the filter container and is attached predeterminedly to the plurality of sides of the filter container;

the container top is perpendicular to the axis of the filter container and is attached predeterminedly to the plurality of sides of the filter container;

the filter head is attached to a central portion of an interior side of the container top;

the inlet-tube aperture is in an inlet side of the filter container; and the outlet-tube aperture is in an outlet side of the filter container.

8. The water-filter kit of claim 7 wherein:

the filter container has a container length to receive the combined length of the filter head and the filter sump; and the filter container has an internal periphery to receive the filter sump with the inlet tube and the outlet tube wound onto an outside periphery of the filter sump.

9. The water-filter kit of claim 7 wherein:

the attachment of the container bottom to the plurality of sides is a removable attachment for removal of the container bottom for access to the filter sump to replace the filter element.

10. The water-filter kit of claim 7 wherein:

the attachment of the container top to the plurality of sides is a removable attachment for removal of the container top for access to the filter sump to replace the filter element.

11. The water-filter kit of claim 5 wherein:

the filter container includes a cylindrical case with a cylindrical wall, a circular container bottom and a circular container top;

the circular container bottom is perpendicular to an axis of the filter container and is attached predeterminedly to the cylindrical wall;

the container top is perpendicular to the axis of the filter container and is attached predeterminedly to the cylindrical wall;

the filter head is attached to a central portion of an interior side of the circular container top;

the inlet-tube aperture is in an inlet portion of the filter container; and the outlet-tube aperture is in an outlet portion of the filter container.

12. The water-filter kit of claim 11 wherein:

the filter container has a container length to receive the combined length of the filter head and the filter sump; and the filter container has an internal periphery to receive the filter sump with the inlet tube and the outlet tube wound onto an outside periphery of the filter sump.

13. The water-filter kit of claim 11 wherein:

the attachment of the circular container bottom to the cylindrical wall is a removable attachment for removal of the circular container bottom for access to the filter sump to replace the filter element.

14. The water-filter kit of claim 11 wherein:

the attachment of the circular container top to the cylindrical wall is a removable attachment for removal of the circular container top for access to the filter sump to replace the filter element.

15. The water-filter kit of claim 5 wherein:

the filter container includes a truncate-conical case with a conical wall, a fixed bottom wall and the circular container top;

the filter head is attached to a central portion of an interior side of the circular container top.

the inlet-tube aperture is in an inlet portion of the filter container; and the outlet-tube aperture is in an outlet portion of the filter container.

16. The water-filter kit of claim 15 and further comprising:

an arcuate handle on a top portion of the truncate conical case.

17. A water-filter kit comprising:

the filter container being a filleted case having flat sides and arcuate sides predeterminedly, a filleted container bottom and a removable filleted container top;

the filleted container bottom is perpendicular to an axis of the filter container and is attached predeterminedly to the filleted peripheral wall;

the container top is perpendicular to the axis of the filter container and is attached predeterminedly to the filleted peripheral wall;

a water filter positioned on an internal portion of the filter container;

the water filter having a filter head, a filter sump attachable removably to the filter head and a filter element positioned removably in the filter sump;

a filter-inlet connection on the filter head positioned in tube-access proximity to an inlet-tube aperture in the filter container;

a filter-outlet connection on the filter head positioned in tube-access proximity to an outlet-tube aperture in the filter container;

the filter container being sized and shaped to contain an inlet tube in a compacted mode, to contain an outlet tube in a compacted mode and to contain the water filter for transportation and storage;

the filter head is attached to a central portion of an interior side of the filleted container top;

the inlet-tube aperture is in an inlet portion of the filter container; and the outlet-tube aperture is in an outlet portion of the filter container.

18. The water-filter kit of claim 15 wherein:

the filter container has a container length to receive the combined length of the filter head and the filter sump; and the filter container has an internal periphery to receive the filter sump with the inlet tube and the outlet tube wound onto an outside periphery of the filter sump.

19. The water-filter kit of claim 15 wherein:

the attachment of the filleted container bottom to the filleted peripheral wall is a removable attachment for removal of the filleted container bottom for access to the filter sump to replace the filter element.

20. The water-filter kit of claim 15 wherein:

the attachment of the filleted container top to the filleted peripheral wall is a removable attachment for removal of the filleted container top for access to the filter sump to replace the filter element.

* * * * *